UNITED STATES PATENT OFFICE.

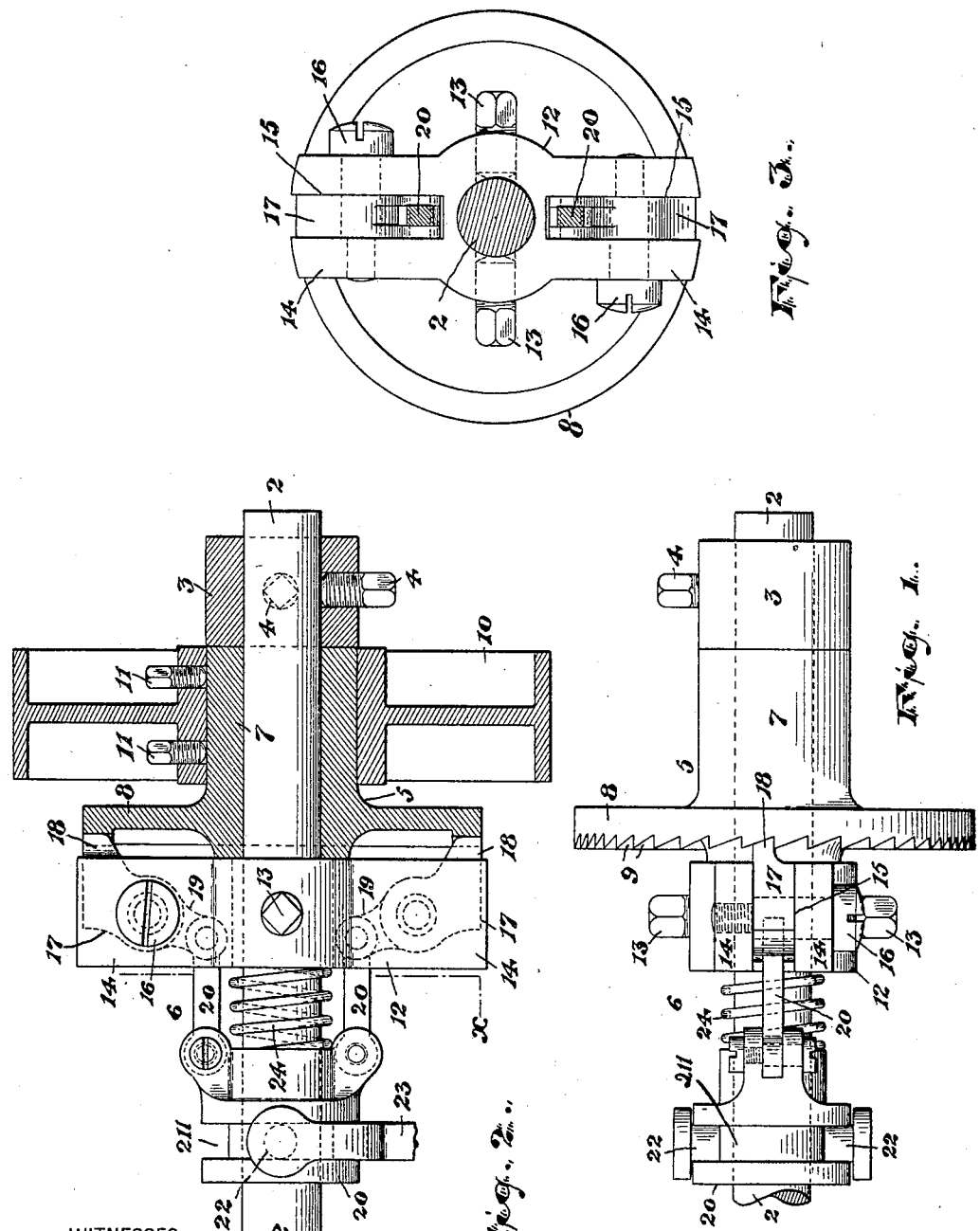

MARTIN DEILLER, OF NEWARK, NEW JERSEY.

SHAFT-CLUTCH.

No. 813,869.  Specification of Letters Patent.  Patented Feb. 27, 1906.

Application filed November 29, 1904. Serial No. 234,727.

*To all whom it may concern:*

Be it known that I, MARTIN DEILLER, a citizen of the United States, residing at Newark, in the county of Essex and State of New Jersey, have invented certain new and useful Improvements in Shaft-Clutches; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to provide a clutch adapted either to transmit motion from a rotary shaft to a pulley or the like upon said shaft or to permit said pulley-wheel to stand loose with relation to the shaft as desired; to enable the motion to be transmitted positively and without opportunity for slipping; to obtain a clutch thus particularly adapted for use with tobacco-stripping machines, as illustrated in my prior patent, No. 716,627, issued December 27, 1902; to provide such a clutch which shall be always under the immediate control of the operator, and to obtain other advantages and results, some of which may be hereinafter referred to in connection with the description of the working parts.

The invention consists in the improved clutch and in the arrangements and combinations of parts of the same, all substantially as will be hereinafter set forth, and finally embraced in the clauses of the claim.

Referring to the accompanying drawings, in which like numerals of reference indicate corresponding parts in each of the several figures, Figure 1 is a plan of a shaft having my improved clutch applied thereto; and Fig. 2 is a side elevation of the same, certain of the parts being shown in section. Fig. 3 is a cross-sectional view taken on line $x$, Fig. 2.

In said drawings, 2 indicates a shaft having adjacent to one end a collar 3, made fast thereon, as by means of set-screws 4. Adjacent to said collar is the loose clutch member 5, and at the opposite side of the same is the other clutch member 6, fast upon the shaft to turn therewith. The loose member 5 comprises a hub 7, having at its end next the other clutch member 6 a peripherally-projecting flange 8, providing at its side a series of ratchet-teeth 9. Upon the said hub 7 of the loose clutch member a wheel 10 is set by means of screws 11 or in any other suitable manner to turn with said loose member, and obviously power may be transmitted either from the shaft to said wheel or from said wheel to the shaft without affecting the nature of my invention.

The member 6 of my improved clutch, which is fast upon the shaft 2, comprises a cross-piece 12, set upon the shaft, as by screws 13 13, and projecting at its ends 14 14 on diametrically opposite sides of said shaft. Each of said arms 14 is slotted, as at 15, and pivoted in said slot upon a screw 16 is a lever 17, which is thus adapted to swing in a plane passing through the shaft 2. The said cross-piece 12 is arranged upon the shaft 2 next the loose member 5, and the outer ends of the levers 17, or ends farthest from the shaft, have extremities 18, adapted to engage the ratchet-teeth 9 upon said loose member, as shown in the drawings. It will be understood that when said extremities engage the ratchet-teeth, as shown in Fig. 1 more particularly, the engagement is positive and the two members of the clutch must turn together without slipping or lost motion.

For operating the said levers 17 to swing them into and out of engagement with the loose clutch member 5 their inner ends 19 are connected by links 20, extending parallel with the shaft 2, to a sleeve 21, which is slidable upon the said shaft. Said sleeve has an exterior circumferential slot or recess 21' which receives the extremities 22 of a forked operating-lever 23, and thus as the said forked end of the lever is moved longitudinally of the shaft the sleeve 20 is correspondingly moved and the levers 17 17 swung accordingly. Preferably a spiral spring 24 is arranged upon the shaft 2 between the body portion 12 and sleeve 21 to normally press them apart and hold the clutch members in clutched relation. Any suitable means for operating the lever 23 may be employed and other variations from the exact construction shown may be made without departing from the spirit and scope of the invention. I do not wish, therefore, to be understood as limiting myself by the positive descriptive terms employed, except as the state of the art may require.

Having thus described the invention, what I claim as new is—

1. In a shaft-clutch, a member having a hub adapted to receive the shaft and being provided with a radially-projecting flange having a circular series of teeth upon one of its sides, a second member having a cross-piece adapted to be mounted directly upon the shaft and lie transversely thereof providing opposite arms which project radially from the shaft, levers fulcrumed intermediate of their ends one upon each arm of the cross-piece and adapted to swing in the plane determined by said arm and the shaft, each lever being adapted at its outer end or end farthest from the shaft to engage the said teeth of the first-mentioned member of the clutch and terminating at its opposite or inner end short of the shaft, and means for engaging said inner ends of the levers to swing the same, one of said clutch members being adapted to be fast on shaft and the other loose.

2. In a shaft-clutch, a member having a hub adapted to receive the shaft and being provided with a radially-projecting flange having a circular series of teeth upon one of its sides, a second member having a cross-piece adapted to be mounted directly upon the shaft and lie transversely thereof, providing opposite arms which project radially from the shaft, levers fulcrumed intermediate of their ends one upon each arm of the cross-piece and adapted to swing in the plane determined by said arm and the shaft, each lever being adapted at its outer end or end farthest from the shaft to engage the said teeth of the first-mentioned member of the clutch and terminating at its opposite or inner end short of the shaft, a controlling-sleeve on the shaft, and links substantially parallel to the shaft connecting the said inner ends of the levers to said sleeve, one of said clutch members being adapted to be fast on the shaft and the other loose.

3. In a shaft-clutch, a member having a hub adapted to receive the shaft and being provided with a radially-projecting flange having a circular series of teeth upon one of its sides, a second member having a cross-piece adapted to be mounted directly upon the shaft and lie transversely thereof, providing opposite arms which project radially from the shaft, levers fulcrumed intermediate of their ends one upon each arm of the cross-piece and adapted to swing in the plane determined by said arm and the shaft, each lever being adapted at its outer end or end farthest from the shaft to engage the said teeth of the first-mentioned member of the clutch and terminating at its opposite or inner end short of the shaft, a controlling-sleeve on the shaft, a coiled spring adapted to surround the shaft between said cross-piece and controlling-sleeve, and links outside said spring and substantially parallel to the shaft connecting the inner ends of the levers to the sleeve, one of said clutch members being adapted to be fast on the shaft and the other loose.

In testimony that I claim the foregoing I have hereunto set my hand this 21st day of November, 1904.

MARTIN DEILLER.

Witnesses:
   CHARLES H. PELL,
   RUSSELL M. EVERETT.